May 12, 1959  H. M. HARRIS  2,886,333
FLAIL-TYPE MATERIAL UNLOADER
Filed June 5, 1957
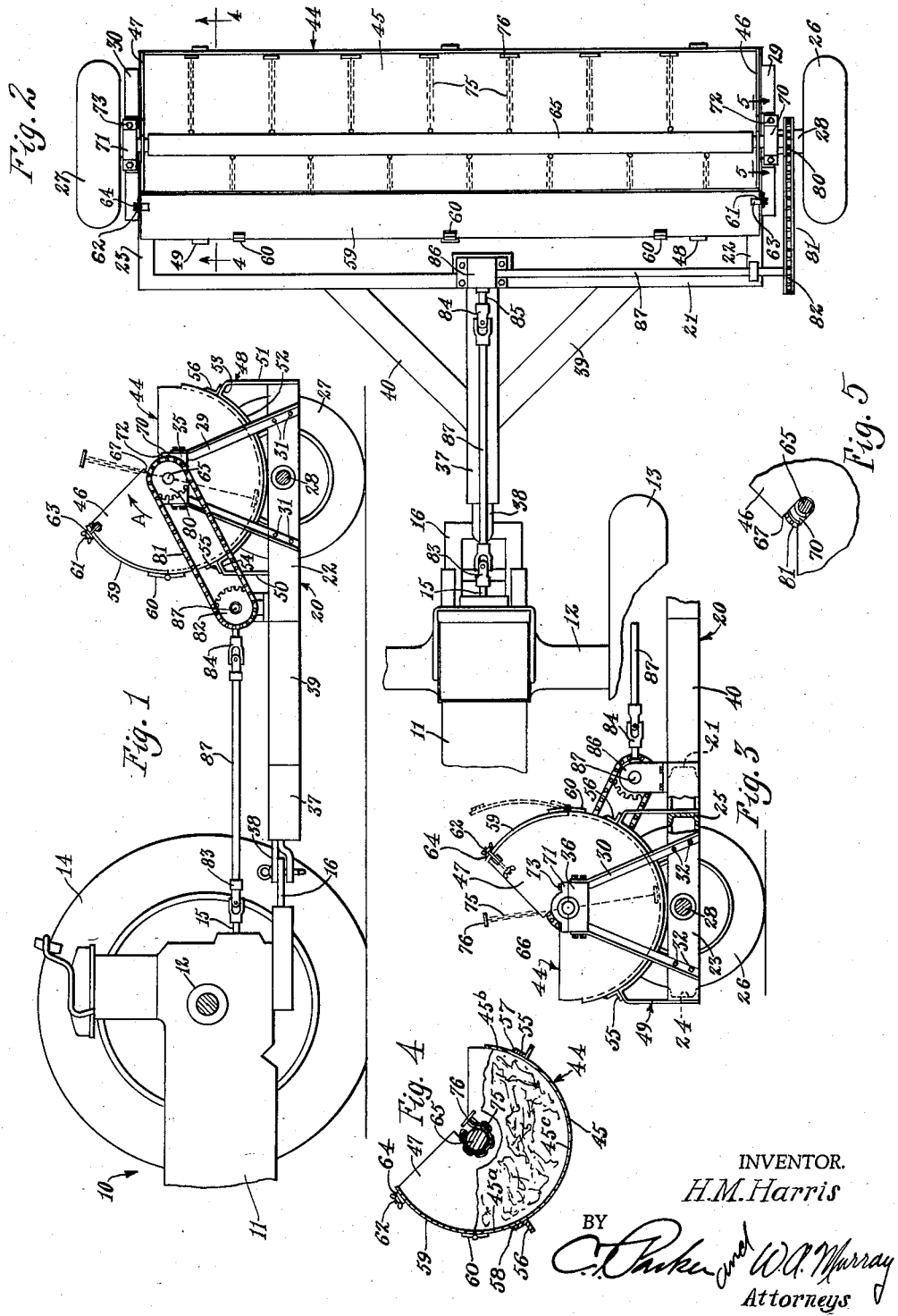
INVENTOR.
*H.M. Harris*
BY
*Attorneys*

United States Patent Office 2,886,333
Patented May 12, 1959

2,886,333

FLAIL-TYPE MATERIAL UNLOADER

Harry M. Harris, Moline, Ill., assignor to Deere Manufacturing Co., Dubuque, Iowa, a corporation of Iowa Application June 5, 1957, Serial No. 663,849

9 Claims. (Cl. 275—3)

This invention relates to a material unloading implement. Still more particularly this invention relates to a manure spreader of a new and novel design.

Present day conventional manure spreaders feature a box type body having a material conveyor moving over the bottom to feed manure loaded in the box rearwardly to rear mounted beaters and widespreads. Materials or manure reaching the beaters and widespread are fed from the rear of the spreader normally in rather a narrow row. In this type of spreader considerable expense is required to manufacture and maintain the drive mechanisms for the floor conveyor, beaters, and widespread. Since the spreader is normally operated from a power take-off shaft on a tractor, the over-all capacity of the spreader must be limited to the capacity of the power take-off shaft to unload it. Therefore the plurality of drives in a conventional spreader operates to limit the size or capacity of the spreader.

A further problem in the conventional type manure spreader is that the manure issuing from the spreader will in many instances be spread in large chunks which has an undesirable effect on the ground it lands since scorched or burned areas result. The desired manner of spreading manure or such material is in a pulverized form evenly spread over the ground.

It is therefore the primary object of the present invention to provide a material unloading implement which overcomes the objections of the present conventional type spreader. Specifically, it is the object of the invention to provide a simplified unloading mechanism which eliminates the requirement of any type of conveyor for moving the material in the path of the feeder. In the contemplated spreading implement, the only mechanism requiring power from the tractor or other sources is the unloading mechanism itself and consequently the over-all capacity of the spreader can be increased.

It is an object of the invention to provide a material spreader having an elongated body disposed transversely to the direction of travel which feeds the material over the rear edge of the body. Extending upwardly from the upper edge of the front side is a shield formed to cause the material to feed rearwardly.

Featured also is a new and novel type of discharging mechanism which features a rotatable transverse shaft having a plurality of axially spaced chain members mounted thereon which upon rotation of the shaft will pass through the manure or other type of material and drive the material rearwardly over the rear wall and in a pulverized condition. Since there is only one drive for the spreader, the over-all capacity of the spreader may be increased and since the longitudinal dimension of the body is transverse to the direction of travel of the implement, the material or manure will spread in a relatively wide path.

Other objects and advantages of the invention will become apparent to those skilled in the art as the nature of the invention is better understood from the following specification and accompanying drawings.

Fig. 1 is a side elevation of the material unloading implement and tractor combination, with only the rear portion of the tractor being shown. The left rear wheel of the tractor and the left wheel of the implement is removed for purposes of clarity.

Fig. 2 is a plan view of the assembly shown in Fig. 1.

Fig. 3 is a side elevation of the right end of the implement with the right wheel and other parts removed for purposes of clarity.

Fig. 4 is a sectional view taken along the lines 4—4 of Fig. 1 showing an operating condition of the unloading mechanism.

Fig. 5 is a sectional view taken substantially along the line 5—5 of Fig. 1.

Referring now to Fig. 1, the tractor 10 is of conventional form having an elongated tractor body 11 supported at its forward end by front steerable wheels, not shown, and at its rear on transverse axle means 12 and transversely spaced apart traction wheels 13, 14. The tractor also includes a conventional power take-off shaft 15 and a drawbar 16 fixed to the underside of the tractor body 11 and projecting rearwardly.

A material unloading vehicle here shown for illustration purposes as a manure spreader includes an elongated main frame 20 having a front transverse member 21 and a pair of rearwardly extending channel members 22, 23 at opposite ends of the front transverse channel member 21, and a rear transverse channel member 24. A third transverse channel member 25 also extends between the side channel members 22, 23 and is positioned rearwardly of but proximate to the front channel member 21. The rigid frame 20 is carried on a pair of transversely spaced wheels 26, 27 by means of an axle 28 journaled at opposite ends on the side channel members 22, 23. At opposite ends of the main frame 20 are a pair of upright A-frames 29, 30 which are bolted as at 31, 32 respectively to the side channel members 22, 23. The upper end of the A-frame 29, 30 support bearing blocks 35, 36 respectively.

The main frame 20 is also supported forwardly by the tractor drawbar 16 through means of a forwardly extending rigid frame member 37 fixed to and extending forwardly from the front transverse channel member 21. The forward end of the frame member 37 is connected to the drawbars 16 by means of a conventional type clevis 38. A pair of struts 39, 40 converge forwardly from transversely spaced portions of the front channel member 21 and are ragidly fixed to the fore-and-aft frame member 37.

A material container 44 has a central elongated body portion 45 of semi-circular or U-shaped cross section which extends between opposite ends 22, 23 of the main frame 20. The body portion 45, as mentioned, may be treated as having a U-shaped cross section including fore-and-aft spaced apart sides or walls 45a, 45b interconnected by a bottom or lower wall portion 45c. At opposite ends of the central body portion 45 are upright fore-and-aft extending end walls 46, 47. Each of the end plates 46, 47 are of circular shape with the upper rear portions removed. The container 44 may therefore be treated as a partial cylindrical body enclosed at both ends for holding material.

The container 44 is supported on the main frame 20 by means of transversely spaced apart bracket structures 48, 49 which fit under the container 44. Referring first to the bracket structure 48, the structure includes a pair of vertical fore-and-aft spaced apart legs 50, 51 fixed to the transverse channel members 25, 24, respectively. The upright portions 50, 51 are interconnected by a fore-and-aft extending portion 52 having an upper surface congruent with the outer surface of the container body 44. The bracket 48 is also shaped to provide a pair of abutments 53, 54 the purpose of which will later become apparent. The bracket structure 49 at the right end of the unit is identical to the bracket structure 48 and detailed disclosure is deemed not necessary.

The container 44 is supported on the bracket structures 48, 49 merely by cradling the lower surface of the body 45 on the curved portions of the bracket structures. Angle iron members 55, 56 are welded as at 57, 58 and operate to engage the abutments such as at 53, 54 to maintain the container 44 in proper angular alinement on the frame 20. The front wall 45a is extended above the rear wall by means of a wall extension or shield 59. The shield 59 is formed to a partial cylindrical shape and serves when in its operating position to guide materials or manure over the rear wall 45b and also to prevent materials from moving forwardly over the front wall. The shield 59 is hinged, as at 60, to the front wall 45a and may be swung forwardly, as indicated in dotted representation in Fig. 3, to enable loading of the container. Outwardly extending brackets 63, 64 are fixed to opposite ends of the shield 59 and are slotted to receive latches 61, 62 on the end walls 46, 47 respectively.

A transverse shaft 65 extends the length of the container 44 and extends through the respective wall sections 46, 47 by means of openings or slots 66, 67 which are inclined rearwardly from the upper edges of the walls. As shown in Fig. 5, relative to the end plate 47, the slot is provided to permit removal of the shaft 65. Opposite ends of the shaft 65 are journaled in bearings supported by the bearing blocks 35, 36 respectively. Bearing caps 70, 71, are bolted as at 72, 73, to the blocks 35, 36 and operate to secure the shaft 65 to the implement frame. The shaft 65 may, of course, be removed independently of the container by removing the caps 70, 71 and raising the shaft 65 from the slots 66, 67.

Flexible arm elements here in the form of link chains 75 are fixed in axially spaced relation on the shaft 65. The outer end of the chains 75 are characterized by having a drag member 76 composed in the present instance of a pair of crossed rods which, as will later be explained, drag through the material for purposes of removing the material from the container. The chains 75 and drags 76 are of such length to be substantially equal to the distance between the shaft 65 and the nearest portion of the container body 45. Since the container 45 is cylindrical, the chain and drag are substantially equal to the radius of the cylinder wall.

Drive mechanism for the shaft 65 is provided at the left end of the implement and includes a sprocket 80 fixed to the outer end of the shaft 65 and a chain 81 which feeds forwardly to a pinion sprocket 82. The shaft drive is driven from the power take-off shaft 15 by means of a pair of fore-and-aft spaced apart universal joints 83, 84 interconnected through a fore-and-aft extending shaft 89, the forward universal joint 83 being connected to the power take-off shaft 15 and the rear universal joint 84 being connected to a gear drive shaft 85 which projects forwardly from a gear housing 86. Enclosed in the gear housing 86 is a pair of meshed beveled gears which drive a transverse drive shaft 87 on which is mounted the pinion sprocket 82.

The manure spreader operates in the following manner. Either the container itself will be moved to a position to collect manure or other such type of material and then placed on the frame, or the entire implement may be so positioned. The mode of loading the manure spreader is unimportant other than to realize that normally the hood 59 will be either removed or moved to its down position to permit the maximum opening at the top of the container. While loading, the chains 75 will be in a depending position and the material loaded in the spreader will normally hold the links in that position until the shaft 65 is caused to rotate. Initial rotation of the shaft 65 will cause the chains 75 to wrap themselves around the shaft 65, as shown in Fig. 4, this position being caused by the resistance of the drags 76 and the chain to move through the material. Upon the manure or other material being removed adjacent to the shaft 65 the drags 76 will begin to extend the chain linkage. Consequently, the manure will gradually unload from the central portion of the container and will continually unload until the chains have fully extended to a position as shown in Figs. 1–3. Inasmuch as the chains are mounted the full length of the shaft 65, material from all portions of the container will be thrown over the rear edge or side 45b. The hood 59 will serve to prevent the material from moving forwardly and on the operator or tractor 10 which the operator is driving. Normal rotation of the shaft will be in the direction of the arrow A, and therefore the natural tendency for the material will be to move rearwardly and out of the rear of the container. The chains 75 and drags 76 will operate to pulverize the material in the spreader and to move the material outward in a flaked or pulverized condition.

While only one form of the invention has been shown for the purpose of clearly and concisely illustrating the principles of the invention, it should be recognized that other forms and variations would occur to one skilled in the art and that there is no intention to narrow or limit the invention beyond the broad general concept herein claimed.

What is claimed is:

1. A material unloading implement comprising: a moblie implement frame movable forwardly over a field; a material container supported on the frame and having a transversely disposed and elongated central body portion of U-shaped cross section including front and rear walls interconnected by a bottom wall, and transversely spaced end walls at opposite ends respectively of the central body portion closing the ends of said body portion; a transversely disposed rotatable shaft centrally located between the front and rear walls above the bottom wall and extending between said end walls; a plurality of chains mounted on and axially spaced on the shaft, a drag member on the free end of each of said chains operative upon rotation of the shaft to drag through material in the container and to discharge it over the rear wall of the container, said chain and drag member being of a length substantially equal to the distance between the shaft and the nearest part of the body portion of the container; and means effecting rotation of the shaft.

2. A material unloading implement comprising: a main mobile frame movable forwardly over a field; a pair of transversely spaced apart supports on the frame; a rotatable shaft transversely disposed relative to the line of advance journaled on the supports; a material container opening from above and formed about the shaft, said container having an inner surface spaced from the shaft; a plurality of axially spaced arm elements mounted on the shaft, each of the arm elements being flexible to bend about the shaft and to extend radially proximate the inner surface of the container; and drag members connected to the free end of the arm elements for driving material rearwardly from the container as the shaft is rotated; and means effecting rotation of the shaft.

3. A material unloading implement comprising: a main mobile frame movable forwardly over a field; a pair of transversely spaced apart upright supports on the frame; a rotatable shaft transversely disposed relative to the line of advance journaled on the supports; a material container having side wall portions spaced front and rear respectively from the shaft and a bottom wall portion beneath the shaft; a plurality of axially spaced arm elements mounted on the shaft, each of the arm elements being flexible to bend about the shaft and to extend radially proximate the inner surface of the container and operative to drive material rearwardly from the container upon rotation of the shaft; and means effecting rotation of the shaft.

4. A material unloading implement attachable to a tractor having a power take-off shaft and an implement connecting means, comprising: a mobile implement frame attachable to the implement connecting means, said frame including transversely spaced upright supports; a material container supported on the frame and having a transversely disposed and elongated central body portion of U-shaped cross section including front and rear walls interconnected by a bottom wall, and transversely spaced end walls at opposite ends respectively of the central body portion closing the ends of said body portion except for shaft-receiving openings therein; a transverse rotatable shaft centrally located between the front and rear walls above the bottom wall and having opposite ends extending through the openings; means on each upright support rotatably supporting opposite ends respectively of the shaft; a plurality of arm elements axially spaced on the shaft having shaft-proximate ends connected to the shaft and radially positioned free ends, said arm elements being extensible radially from the shaft whereby the free ends may move between positions adjacent to and remote from the shaft and being automatically extensible in response to rotation of the shaft to cause the free ends to engage material next adjacent the shaft and to discharge it over the rear wall of the container; a wall extension extending upwardly from the front wall and formed to prevent material from passing over the front wall; and drive means between said shaft and the power take-off shaft for rotating the former.

5. A material unloading implement attachable to a tractor having a power take-off shaft and an implement connecting means, comprising: a mobile implement frame attachable to the implement connecting means, said frame including transversely spaced upright supports; a material container supported on the frame and having a transversely disposed and elongated central body portion of U-shaped cross section including front and rear walls interconnected by a bottom wall, and transversely spaced end walls at opposite ends respectively of the central body portion closing the ends of said body portion except for shaft-receiving openings therein; a transverse rotatable shaft centrally located between the front and rear walls above the bottom wall and having opposite ends extending through the openings; means on each upright support rotatably supporting opposite ends respectively of the shaft; a plurality of arm elements axially spaced on the shaft having shaft-proximate ends connected to the shaft and radially positioned free ends, said arm elements being extensible radially from the shaft whereby the free ends may move between positions adjacent to and remote from the shaft and being automatically extensible in response to rotation of the shaft to cause the free ends to engage material next adjacent the shaft and to discharge it over the rear wall of the container; and drive means between said shaft and the power take-off shaft for rotating the former.

6. The invention defined in claim 5 in which the shaft receiving openings extend to an upper edge of the end walls thereby making said openings accessible from above, and further characterized by the rotatable supporting means on the upright supports being detachable to permit removal of the shaft independently of the container.

7. The invention defined in claim 5 in which said container is detachably supported on the frame to permit interchanging of empty and full containers.

8. A material unloading implement comprising: forwardly movable frame structure including an elongated transversely disposed material container having front and rear walls interconnected by a bottom wall; shaft means supported by the structure extending longitudinally of the container between the front and rear walls and above the connecting wall; means on the shaft means including arm elements having shaft-proximate ends and free ends, said arm elements being extensible radially relative to the shaft means whereby the free ends may move between positions adjacent the shaft means and positions remote the shaft means; and means rotating the shaft means.

9. A material unloading implement comprising: forwardly movable frame structure including an elongated transversely disposed material container having front and rear walls interconnected by a bottom wall, said front wall being formed to prevent material from moving forwardly out of the container; shaft means supported by the structure extending longitudinally of the container between the front and rear walls and above the connecting wall; means on the shaft means including arm elements having shaft-proximate ends and free ends, said arm elements being extensible radially from the shaft means whereby the free ends may move between positions adjacent the shaft means and positions remote the shaft means and being automatically extensible in response to rotation of the shaft means to cause the free ends to engage material next adjacent the shaft and to drive the material over the rear wall; and means rotating the shaft means.

References Cited in the file of this patent

UNITED STATES PATENTS

| | | |
|---|---|---|
| 402,183 | Oviatt | Apr. 30, 1889 |
| 2,318,881 | Mundy | May 11, 1943 |
| 2,525,023 | Ensminger | Oct. 10, 1950 |
| 2,531,732 | Hoffman | Nov. 28, 1950 |
| 2,597,485 | Hillyer | May 20, 1952 |

FOREIGN PATENTS

| | | |
|---|---|---|
| 41,555 | Denmark | Jan. 18, 1930 |
| 70,305 | Germany | Aug. 14, 1893 |
| 299,827 | Germany | Aug. 11, 1917 |